W. W. GRAVES.
Shovel-Plow.
No. 30,729. Patented Nov. 27, 1860.
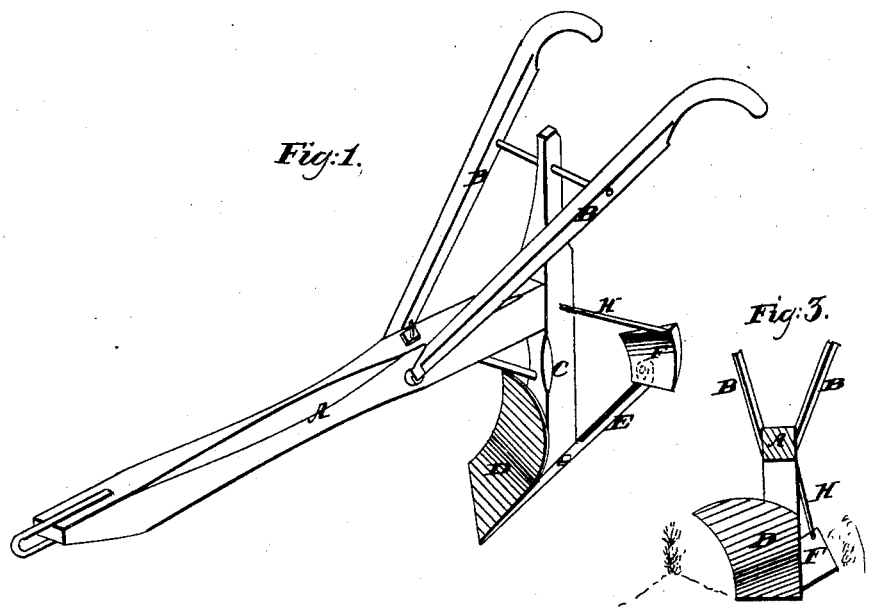
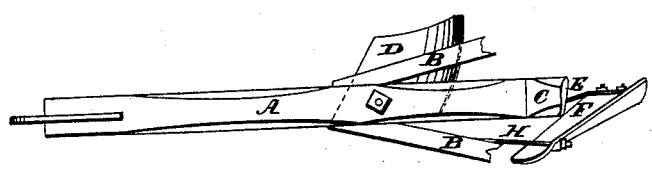
Witnesses:
J. W. Coombs.
R. S. Spencer
Inventor:
W. W. Graves
per Munn & Co.
Attorneys

UNITED STATES PATENT OFFICE.

W. W. GRAVES, OF FORT ADAMS, MISSISSIPPI.

IMPROVEMENT IN COTTON-PLOWS.

Specification forming part of Letters Patent No. 30,729, dated November 27, 1860.

*To all whom it may concern:*

Be it known that I, W. W. GRAVES, of Fort Adams, in the county of Wilkinson and State of Mississippi, have invented a new and Improved Scraper and Plow; and I do hereby declare that the following is a full, clear, and exact description of the same, reference being had to the accompanying drawings, making a part of this specification, in which—

Figure 1 is a perspective view of my improved plow and scraper. Fig. 2 is a front end view of the same.

Similar letters of reference indicate corresponding parts in the figures.

This invention is intended more especially for plowing and scraping cotton crops.

The invention consists in attaching to a projected landside-bar on the land side of an ordinary light turn or shovel plow a scraping-wing, which is bolted and braced in such a position that its cutting-edge will skim along the surface of the drill or ridge, cut off and thin out the young plants, and scrape the weeds down into the center of the furrow behind the plow, all as will be hereinafter described.

To enable those skilled in the art to fully understand my invention, I will proceed to describe its construction and operation.

In the drawings, A is a beam; B, the handles, and C the standard, of an ordinary light turn-plow. D E is the landside-bar, which is extended out some distance behind the lower end of standard C and made quite narrow, its rear end being turned up, as shown in dotted lines, Fig. 1, and several holes punched through it. To this curved end of the bar E is bolted a quadrangular plate, F, which is slightly curved, as shown in Figs. 1 and 2. This plate is bolted to the bar E, so that it will project out from the land side of the plow, and at the same time the lower edge, which is the cutting-edge, is turned upward, so that it will be parallel, or nearly so, with the sides of the ridges. This plate is also set so that the outer edge of the scraper will be forward of the rear edge.

H is a bar, which is attached to the highest corner of the scraper-plate and to the rear end of the beam A.

The scraping-plate is in this manner arranged in such a relation to the sides of the ridges of cotton-plants that as the plow passes through the center of the furrows the lowest edge of the plate will skim along the surface of the ridge on the land side of the plow and nicely scrape off all weeds, &c., leaving the hill clear and smooth, and leaving the scrapings in the middle of the furrows to die and rot. The several holes made in the turned-up end of the landside-bar E will admit of the plate being raised or lowered as occasion requires.

I do not desire to claim broadly a scraping-plate combined with and placed on the landside of a plow; but

What I claim as new, and desire to secure by Letters Patent, is—

The scraping-plate F, when the same is attached to the end of a long and narrow landside bar, E, and otherwise arranged so as to cut and throw the scrapings down into the center of the furrow, as set forth.

W. W. GRAVES.

Witnesses:
   ROBT. T. LESSLEY,
   W. A. TAYLOR.